(12) United States Patent
Millard et al.

(10) Patent No.: US 7,949,665 B1
(45) Date of Patent: May 24, 2011

(54) RAPIDLY TRAVERSING DISC VOLUMES DURING FILE CONTENT EXAMINATION

(75) Inventors: John Millard, Pasadena, CA (US);
Cassio Goldschmidt, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 415 days.

(21) Appl. No.: 10/993,591

(22) Filed: Nov. 19, 2004

(51) Int. Cl.
G06F 17/30 (2006.01)

(52) U.S. Cl. ......... 707/752; 707/741; 707/812; 707/823

(58) Field of Classification Search .................... 707/102
See application file for complete search history.

(56) References Cited

U.S. PATENT DOCUMENTS

| | | |
|---|---|---|
| 5,089,958 A | 2/1992 | Horton et al. |
| 5,255,270 A | 10/1993 | Yanai et al. |
| 5,297,258 A | 3/1994 | Hale et al. |
| 5,325,519 A | 6/1994 | Long et al. |
| 5,331,646 A | 7/1994 | Krueger et al. |
| 5,339,406 A | 8/1994 | Carney et al. |
| 5,381,545 A | 1/1995 | Baker et al. |
| 5,404,361 A | 4/1995 | Casorso et al. |
| 5,487,160 A | 1/1996 | Bemis |
| 5,524,205 A | 6/1996 | Lomet et al. |
| 5,535,188 A | 7/1996 | Dang et al. |
| 5,557,770 A * | 9/1996 | Bhide et al. .............. 711/161 |
| 5,598,528 A | 1/1997 | Larson et al. |
| 5,604,853 A | 2/1997 | Nagashima |
| 5,604,862 A | 2/1997 | Midgely et al. |
| 5,628,016 A | 5/1997 | Kukol |
| 5,640,561 A | 6/1997 | Satoh et al. |
| 5,659,747 A | 8/1997 | Nakajima |
| 5,677,952 A | 10/1997 | Blakley, III et al. |
| 5,717,849 A | 2/1998 | Brady |
| 5,751,936 A | 5/1998 | Larson et al. |
| 5,761,680 A | 6/1998 | Cohen et al. |
| 5,778,392 A | 7/1998 | Stockman et al. |
| 5,794,052 A | 8/1998 | Harding |
| 5,802,264 A | 9/1998 | Chen et al. |
| 5,819,015 A | 10/1998 | Martin et al. |

(Continued)

FOREIGN PATENT DOCUMENTS

EP 0751462 A1 1/1997

(Continued)

OTHER PUBLICATIONS

Green, R.J., et al., "Designing a Fast, On-Line Backup System for a Log-structured File System", *Digital Technical Journal*, vol. 8, No. 2, pp. 32-45, (1996), U.S.A.

(Continued)

*Primary Examiner* — Bai D Vu
(74) *Attorney, Agent, or Firm* — Fenwick & West LLP

(57) ABSTRACT

Methods, apparatuses, and computer-readable media for rapidly traversing movable storage media during file content examination for malicious computer code. An embodiment of the inventive method comprises the steps of: accessing an enumerated list of electronic files (220) stored on a movable storage medium (420); identifying at least one batch of electronic files (320) stored on the movable storage medium (420); associating each electronic file stored on the movable storage medium (420) within the batch of electronic files with a physical file location on the movable storage medium (310); creating a sorted list electronic files by the file's physical location on the movable storage medium (330); and examining the identified batch of electronic files on the movable storage medium (420) according to the sorted list (340).

18 Claims, 7 Drawing Sheets

U.S. PATENT DOCUMENTS

| | | | |
|---|---|---|---|
| 5,835,953 A | 11/1998 | Ohran | |
| 5,893,140 A | 4/1999 | Vahalia et al. | |
| 5,933,368 A | 8/1999 | Ma et al. | |
| 5,982,886 A | 11/1999 | Itami et al. | |
| 6,012,145 A | 1/2000 | Mathers et al. | |
| 6,016,553 A | 1/2000 | Schneider et al. | |
| 6,038,636 A | 3/2000 | Brown, III et al. | |
| 6,185,666 B1* | 2/2001 | Murray et al. | 711/173 |
| 6,199,178 B1 | 3/2001 | Schneider et al. | |
| 6,240,527 B1 | 5/2001 | Schneider et al. | |
| 6,263,338 B1 | 7/2001 | Ronstrom et al. | |
| 6,289,446 B1 | 9/2001 | Nilsson | |
| 6,289,509 B1* | 9/2001 | Kryloff | 717/170 |
| 6,345,283 B1 | 2/2002 | Anderson | |
| 6,363,487 B1 | 3/2002 | Schneider | |
| 6,408,314 B1* | 6/2002 | Liu | 707/205 |
| 6,415,300 B1* | 7/2002 | Liu | 707/204 |
| 6,535,891 B1* | 3/2003 | Fisher et al. | 707/203 |
| 7,039,754 B2* | 5/2006 | Sasaki | 711/103 |
| 7,234,164 B2* | 6/2007 | Carmona | 726/22 |
| 7,356,540 B2* | 4/2008 | Smith et al. | 707/101 |
| 2002/0116573 A1* | 8/2002 | Gold | 711/111 |
| 2003/0126247 A1* | 7/2003 | Strasser et al. | 709/223 |
| 2003/0177435 A1* | 9/2003 | Budd et al. | 714/776 |
| 2004/0210769 A1* | 10/2004 | Radatti et al. | 713/201 |

FOREIGN PATENT DOCUMENTS

| | | |
|---|---|---|
| EP | 1091299 A2 | 4/2001 |
| JP | 62-114595 | 11/1988 |
| JP | 01-036972 | 8/1990 |
| JP | 04-038739 | 8/1993 |
| JP | 07-059861 | 9/1996 |
| WO | WO 91/01026 A2 | 1/1991 |
| WO | WO 96/12232 A2 | 4/1996 |
| WO | WO 98/26353 A1 | 6/1998 |
| WO | WO 99/12101 A1 | 3/1999 |
| WO | WO 99/56212 A1 | 11/1999 |
| WO | WO 00/65447 A1 | 11/2000 |
| WO | WO 01/04801 A1 | 1/2001 |
| WO | WO 01/33357 A2 | 5/2001 |

OTHER PUBLICATIONS

Hultgren, C.D., "Fault-tolerant personal computers safeguard critical applications", I&CS (Instruments and Control Systems), vol. 65, No. 9, Radnor, PA, US, pp. 23-27, (Sep. 1992).

Robinson, J.T., "Analysis of Steady-State segment storage utilizations in a log-structured file system with least-utilized segment cleaning", IBM Research Division, T. J. Watson Research Center, pp. 29-32, Yorktown Heights, NY.

Castelleto, et al., "DB2 for VSE & VM Archiving and Recovery", IBM VSE/ESA, 1-18, (1996), Toronto, Canada.

Rodriguez-Rivera, et al., Proceedings of the International Symposium on Memory Management, Vancouver, Canada, Oct. 17-19, 1998, pp. 79-85, especially Figure 3 and pp. 82-83 -footprint reduction.

Seltzer, Margo, "An Implementation of a Log-Structured File System for UNIX," Proceedings of the Winter 1993 USENIX Technical Conference, USA USENIX Jan. 1993, pp. 307-326.

Suzuki,Takayuki, "A Design of a File Manager with History Management Mechanism," Technical Report of Information Processing Society of Japan, Japan, IPSJ, Oct. 29, 1993, vol. 93, No. 96 (93-DBS-96) pp. 75-83.

Gray, Jim, "Transaction Processing: Concepts and Techniques," U.S. A. Morgan Kaufmann Publishers, Inc. 1993, pp. 723-732.

* cited by examiner

Figure 6

Sorted Cluster Locator for momsletter.doc

| Cluster | Track | Sector |
|---------|-------|--------|
| 3 | 1 | 3, 4, 5 |
| 15 | 3 | 2, 3, 4 |
| 32 | 6 | 25, 26, 27 |
| 95 | 12 | 252, 253, 254 |
| . | . | . |
| . | . | . |

610

620  630  640

RAPIDLY TRAVERSING DISC VOLUMES DURING FILE CONTENT EXAMINATION

TECHNICAL FIELD

The present invention relates to a method for examining hard disc content and more particularly to a method for rapidly traversing hard disc volumes during content examination.

BACKGROUND ART

One of the key components of any computer system is a place to store and retrieve data. Computer systems have many different places where data can be stored and one of the most common of these is movable digital storage such a disc drive. A significant advantage of movable digital storage is its inherent ability to be reused. Once a file or data is no longer needed it can be deleted and the storage space that originally housed these deleted files, freed. Movable digital storage media are storage media that involve some type of mechanical manipulation during data input and output. Data from a hard disc is accessed by typically rotating the disc and moving a disc head over the region containing the data. Movable digital storage media such as magnetic hard discs or optical discs are divided into regions of memory. When a disc is completely free of data, new data is placed on the medium in a contiguous manner. As time passes, information is added and removed from the storage medium. As a result, the organization of the file's location on the disc becomes increasingly complex. Areas of the disc that are available for storage are irregular in size, and often interspersed between active files. To utilize these chunks of storage space on a disc, the data or file is broken into packets and stored throughout the disc in whatever space is available.

FIG. 1 presents a typical hard disc organizational structure. The surfaces of the disc 100 are divided into a number of portions where information, such as data, is stored. These portions are designated as tracks 110, sectors 120, and clusters 130. There are a large number of tracks 110 situated in concentric circles around the center of the disc 100. Each track 110 on a disc 100 is further subdivided into a number of sectors 120 which are essentially just short individual segments of one of the tracks 110 on the drive surface as the tracks 110 are divided radially from the center of the disc 100. Two or more sectors 120, typically contiguous, and typically with an integral number of clusters in a track, on the same track 110 constitute a cluster 130. A cluster 130 is the minimum unit the operating system uses to store information. Thus, the number of clusters 130 and their size determines the storage capacity of the disc 100. When writing data to the disc 100, data is divided to fit into clusters 130, or blocks as they are often called. Clusters 130 cannot be divided. Thus a file the size of 1 byte may occupy a cluster 130 the size of 32 bytes if the minimum cluster 130 size on the disc 100 is 32 bytes. Likewise, a file the size of 35 bytes will require two complete clusters 130 leaving 29 bytes of storage space unavailable. To place the data into the cluster 130, a head motor moves a head 140 so that a head is positioned over the particular track 110, sector 120, and cluster 130. Understandably, the positioning of the head over the cluster 130 is critical with regard to the reading or writing of data.

To facilitate the understanding of the reader, a general outline of the organization of files, directories, file information entries, disk allocation tables, and such is provided. These systems are generally similar between the various file systems. File information entries contain the information needed to locate the physical parts of a file on the drive. This information includes where each section of the file lies, file attributes, compression and encryption data, and other information. Examples of file information entries are File Allocation Table (FAT) entries, Master File Table (MFT) entries, and Inode entries. The entries are located, correspondingly, in a File Allocation Table (on Windows FAT drives), a Master File Table (on NTFS drives), or an Mode table (basic UNIX file systems). Files are separately organized in directories. These directories are typically arranged in a tree structure on a disk. A directory may contain pointers to file information entries, as well as to other directories. The layout and use of disk allocation tables used for tracking of the allocated and free space on a drive are relevant to this patent. Other examples of such file systems using such structures include VFAT, FAT32, FAT16, HFS, NTFS, EXT2, EXT3, and ReiserFS.

Enumerating files, and examining the content of those files on a disk drive are pertinent to the present invention. There are typically 2 ways of enumerating files. The first is to start at the root directory or folder on the drive. Enumerate the files in the folder, then for each folder in the folder, repeat the operation just described, operating inside the enumerated folder. This proceeds down the folder tree until a folder is found without folders in it. As you complete each folder, you proceed to the next folder in the parent folder. The second method of building a file list is to enumerate the entries in the file information tables described above. In that case some extra work may need to be done to identify the folder the file is contained in, depending on the organization of the target file system. For purposes of this patent application, the list of files created in either of these manners is referred to an Enumerated File List. The Enumerated File List has typically little or no relation to where the files are actually located on the drive.

The actual physical blocks of data on the disc 100 corresponding to each file are not typically, as previously mentioned, stored in a contiguous or linear order. In practice, there is considerable physical discontinuity of recorded data blocks, both within individual files, and from file to file in a disc file system. Indeed, even if linearly recorded at the outset, data blocks of files in a computer system may become highly fragmented as blocks are read, revised, and written, and as blocks are added to the file over the course of normal usage. As a result a fragmented file 150 can reside in multiple clusters 130 on multiple tracks 110. Even a newly created file may be fragmented if its data is larger than the next free spaces made available by the operating system. This is done for a number of reasons, not the least of which is to maximize the storage capability of the disc. Keeping this information up-to-date involves the file information entries, the directories and folders, and the file information tables, and the structures used to track free and allocated disk space.

The operating system can organize the files to optimize access, leave them in the order created, or any other order its algorithms elect. The files can be categorized or prioritized based on the file's role in the machine's function. Operating system files such as DLL files may be placed in a location that provides quicker access. Application files may be blocked together and data files may be distributed randomly to maximize the available storage capacity or to speed loading of applications and data.

The result of this disorder and fragmentation of raw disc data is that the process of reading files using normal operating system calls (or any other disc access method that operates similarly) generally results in significant disc head repositioning during the read operation. Files can be located in several different sectors and tracks. Since this mechanical movement of the head can be the slowest operation on the computer, sometimes by orders of magnitude, reading a disc in this manner can be highly inefficient.

Scanning an entire disc for particular types of content can be particularly inefficient. Such a scan operation is typically conducted through the operating system on a file by file basis. As the scanning program requests the contents of a particular file from the operating system, the operating system, using the file directory and information entry, locates the contents from the physical locations on the disc, positions the head over the sector or sectors, and reads the data into random access memory (RAM) where it can be used by the program. As a result, a scan of the entire disc may result in the head traversing the disc multiple times. Accordingly there is a need to reduce the movement of the disc head thereby increasing the speed at which the volumes of a disc can be examined.

DISCLOSURE OF INVENTION

Methods, apparatuses, and computer-readable media for rapidly traversing movable storage media during file content examination for malicious computer code. An embodiment of the inventive method comprises the steps of: accessing an enumerated list of electronic files (220) stored on a movable storage medium (420); selecting at least one batch of electronic files (320) stored on the movable storage medium (420); associating each electronic file stored on the movable storage medium (420) within the batch of electronic files with a physical file location on the movable storage medium (310); creating a sorted list electronic files by the file's physical location on the movable storage medium (330); and examining the identified batch of electronic files on the movable storage medium (420) according to the sorted list (340).

BRIEF DESCRIPTION OF THE DRAWINGS

These and other more detailed and specific objects and features of the present invention are more fully disclosed in the following specification, reference being to the accompany drawings, in which:

FIG. 6 is a block diagram of one embodiment of a cluster address list for a file contained on a movable storage medium.

DETAILED DESCRIPTION OF THE PREFERRED EMBODIMENTS

The present invention minimizes the mechanical movement of data input devices to decrease the amount of time it takes to examine a movable medium's content. By conducting the examination of the movable medium according to the content's physical location rather than by usual organization by folder or other logical order, the elapsed time to examine the contents of the entire storage medium can be drastically reduced.

The present invention offers the following advantages over the prior art:
- an ability to reduce the examination time of a movable digital storage medium;
- increased processor time availability by reducing the completion time of a comprehensive scan of its associated movable storage providing for a more reasonable scanning of very large volumes; and
- reducing general mechanical movement and wear and tear on the drive.

Having files containing data and/or executable code stored at various locations throughout a movable storage medium impact input performance. One particular task regarding input of files is when the entire contents of a movable storage medium are scanned for malicious computer code. Malicious computer code includes computer code commonly referred to as computer viruses, worms, Trojan horses, spam, checking TCP/IP address lookup files, such as lmhosts, for spoofing DNS, spy-ware, adware, and any other type of unauthorized or unsolicited computer code that appears in a computer without an authorized user's knowledge and/or without an authorized user's consent.

Figure 1:
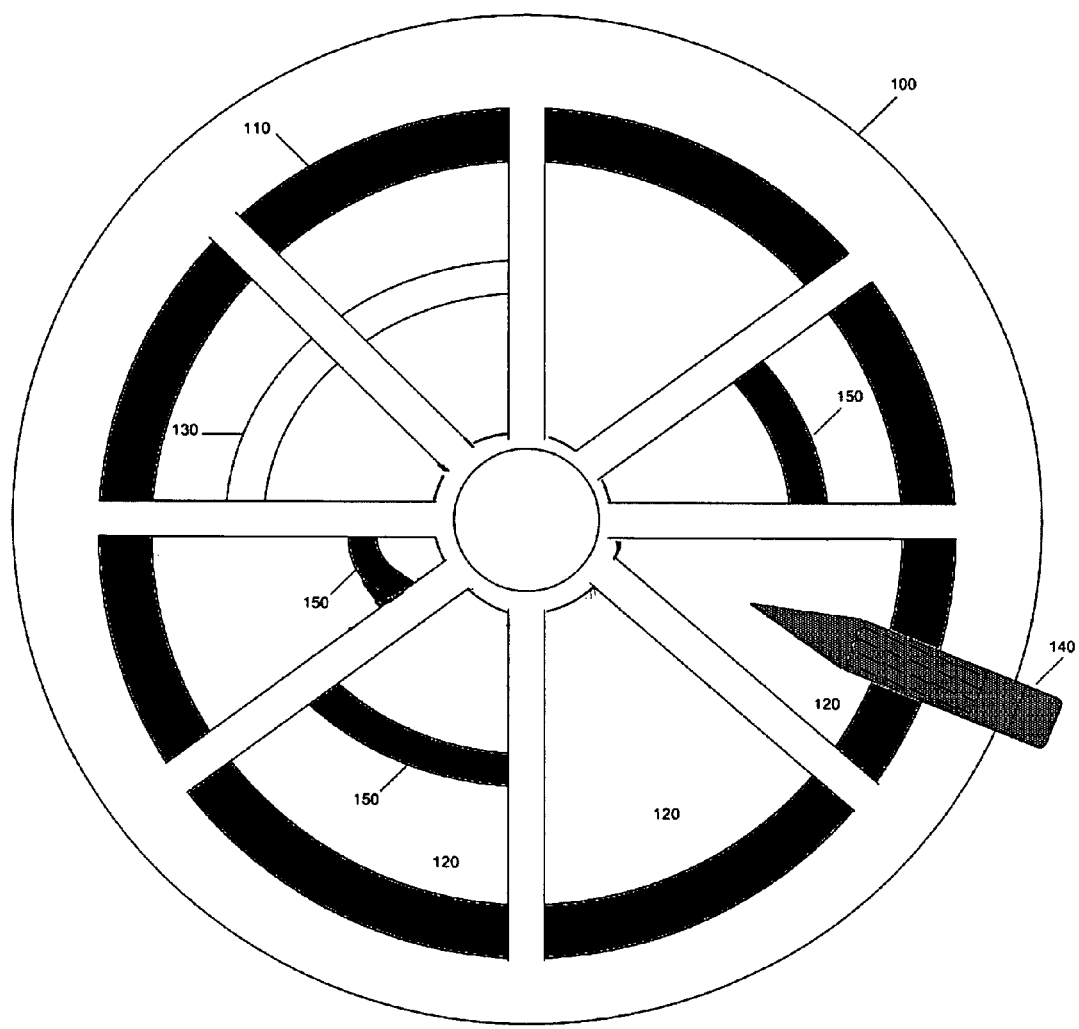
FIG. 1 is a plan diagram showing storage architecture typically found on a hard disc as found in prior art.
Figure 2:
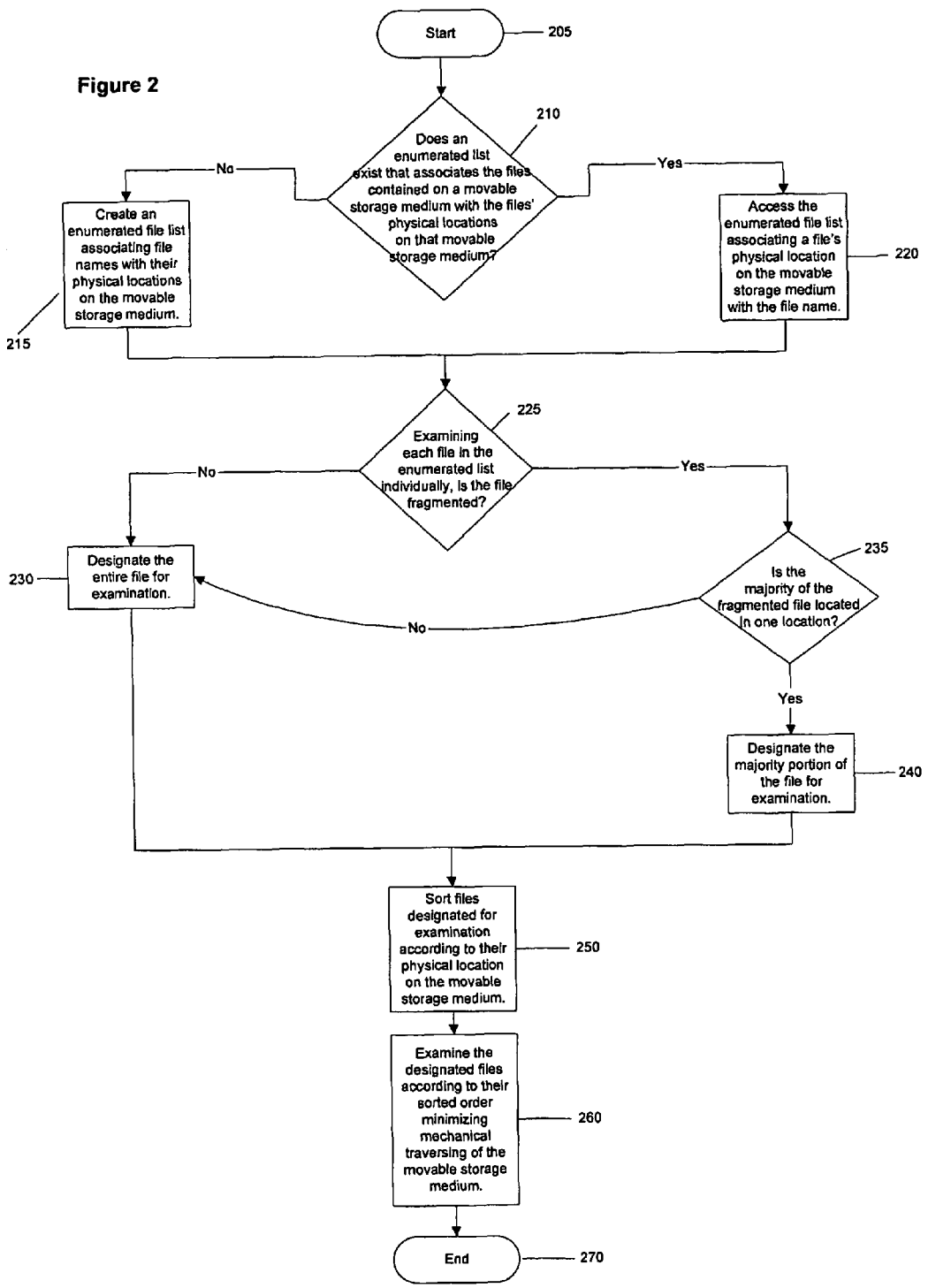
FIG. 2 is a flow diagram of one embodiment for traversing a movable storage medium during file content examination by sorting files according to their physical location.

FIG. 2 is a flow diagram of one embodiment for rapidly traversing a movable storage medium during file content examination wherein the files stored on the movable storage medium are examined according to their physical location. Typically a scanning program scans files according to the enumerated file list. When a file is examined by the scanning program, the disc head traverses the movable medium until all or part of the entire contents of the file have been input into RAM. In one embodiment, the method determines whether an enumerated list 210 exists that associates the files contained on a movable storage medium with the files' physical locations on the movable storage medium.

If the list does not exist or access cannot be obtained, an enumerated list is created 215 associating the file names with their physical locations on the movable storage medium 235. This involves examining the file information table directly, or requesting that information from the file information table via an O/S call. If such an enumerated list does exist, the method accesses 220 the list to obtain each file's physical location on the movable storage medium. From the list, files can be selected for examination based on a variety of differing criteria, or the entire list comprising a logical volume can be selected or examination.

Concerning the files selected for examination, a determination is then made 225 as to whether the files are fragmented. When a file is fragmented, the method designates 230 a fragmented portion or portions of the file for use in determining the order (sort) that the file is to be read. Furthermore, the method, in yet another embodiment, determines whether the entire fragmented file or merely a select number of portions of the fragmented file must be read. In both instances, a criterion is established to identify and designate a portion or portions of the fragmented file, and thus a corresponding physical location on the movable storage medium, for sorting with respect to the other files selected for examination. In one embodiment the content of each fragment of a fragmented file is associated with each fragment's physical location to determine whether a majority of the file is located in one location on the movable storage medium 235. When a majority of the file is located in one location on the movable storage medium 235, that location is used in the sorting process. In another embodiment of the present invention, the first sector of the fragmented file is designated 230 for sorting purposes. In yet another embodiment of the present invention, the method examines whether the majority of the fragmented file is contiguous, or the location of the last sector, or whether the majority of the fragmented file is within a certain region of the movable storage medium as criteria for determining what portion of the fragmented file will be used in the sorting process. When the file is so fragmented that no clear majority can be determined, the average physical location, or median physical location of the fragmented file can be designated 230 for sorting purposes. Other methodology known to one skilled in the art for designating 230 what portion of a fragmented file will be used for sorting purposes can be employed. In still yet another alternative embodiment, the fragmentation of a file is not considered and sorting with respect to other files selected for examination is based on the physical location of the file's first cluster on the movable storage medium 235.

After the files are designated for examination, the resulting enumerated file list is sorted 250 according to each file's physical location on the movable medium. The sorted list can be retained in volatile or nonvolatile memory as required. In one embodiment, the sorted list of files is retained in nonvolatile memory and updated as required as new files are added to or deleted from the movable storage. By eliminating or reducing the time needed to create a sorted list of files, the overall time for file examination can be reduced. With the creation of a list of designated files sorted by the files' physical locations, examination of the files can be conducted 260 to minimize the movement of mechanical devices such as the disc head reader on a hard disc drive. The minimization of mechanical traversal of the movable storage medium can significantly reduce the overall time required to examine the files stored on a movable storage medium for malicious computer code.

Figure 3:
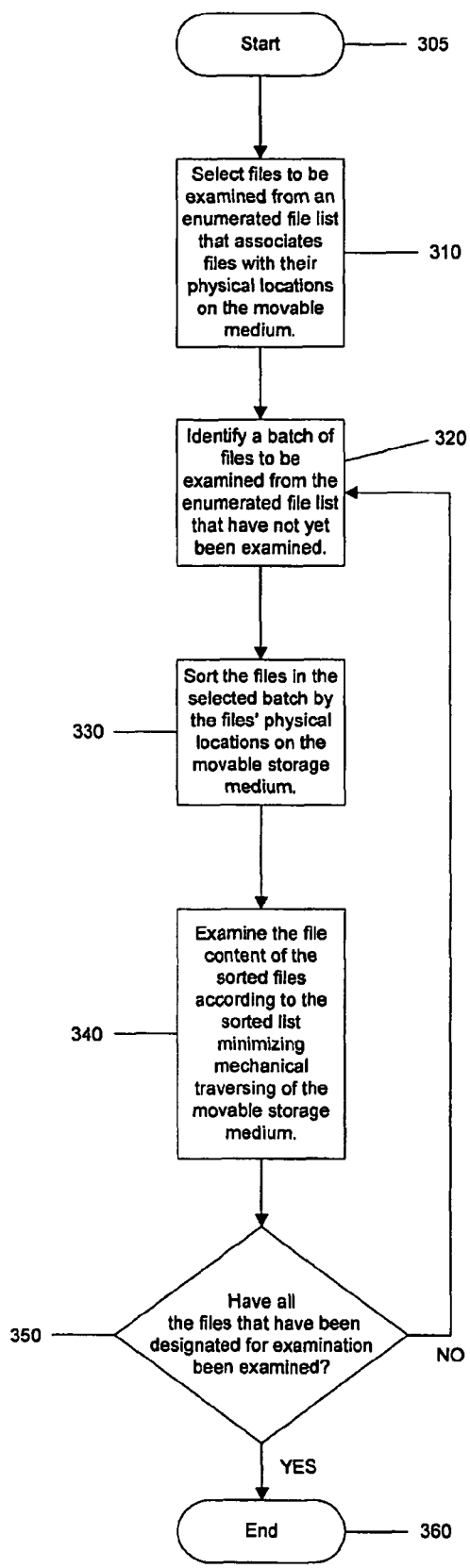
FIG. 3 is a flow diagram of one embodiment for traversing a movable storage medium during file content examination by sorting a batch of files according to their physical location.

FIG. 3 is a flow diagram of one embodiment for rapidly traversing a movable storage medium during file content examination wherein the files selected for examination are batched during the sorting procedure. As described herein, a batch of n files is selected 310 for examination from an enumerated list associating the file names contained on the movable storage medium 235 with each files' physical locations. The batch of n files, where n is a number significantly less than the total number of files to be examined, is chosen 320 from the selected list of files and sorted according to the physical location of the files on the movable storage medium 235. Each of the steps shown in FIG. 3 and the other flow diagrams is of a type well known in the art. Each step can itself include a sequence of operations that need not be described herein. Those skilled in the relevant art can create source code, microcode, program logic arrays, computer-executable instructions, or otherwise implement the invention based on the flowchart of FIG. 3 and the detailed description provided.

A significant time savings can be achieved by batching, sorting, and reading files, in small groups whose numbers are significantly less that then entire files list. The criteria for batch file selection are broad but are typically inconsequential in comparison to the size of the batch. A primary reason for scanning the files in batches is to avoid building and then sorting a complete enumerated list before beginning the scanning process. Building this list is typically expensive with respect to processing and accessing time. A preferred embodiment for selecting files to include in a bath is to select the next N unexamined files from the enumerated list, where N is the size of the batch. Criteria for such selection and examination are well known to one skilled in the art, and it is contemplated that the present invention can accommodate such selection criteria.

Once a batch of files has been selected for examination, the batch is sorted 330 according to the physical location of the files on the movable storage medium. The files of the batch are examined according to the sorted list 340, minimizing the amount of mechanical movement of the input mechanisms. Once the examination is complete, or while the examination process is ongoing, subsequent batches of files are sorted 330 until all the files selected for examination have been examined 350.

Figure 4:
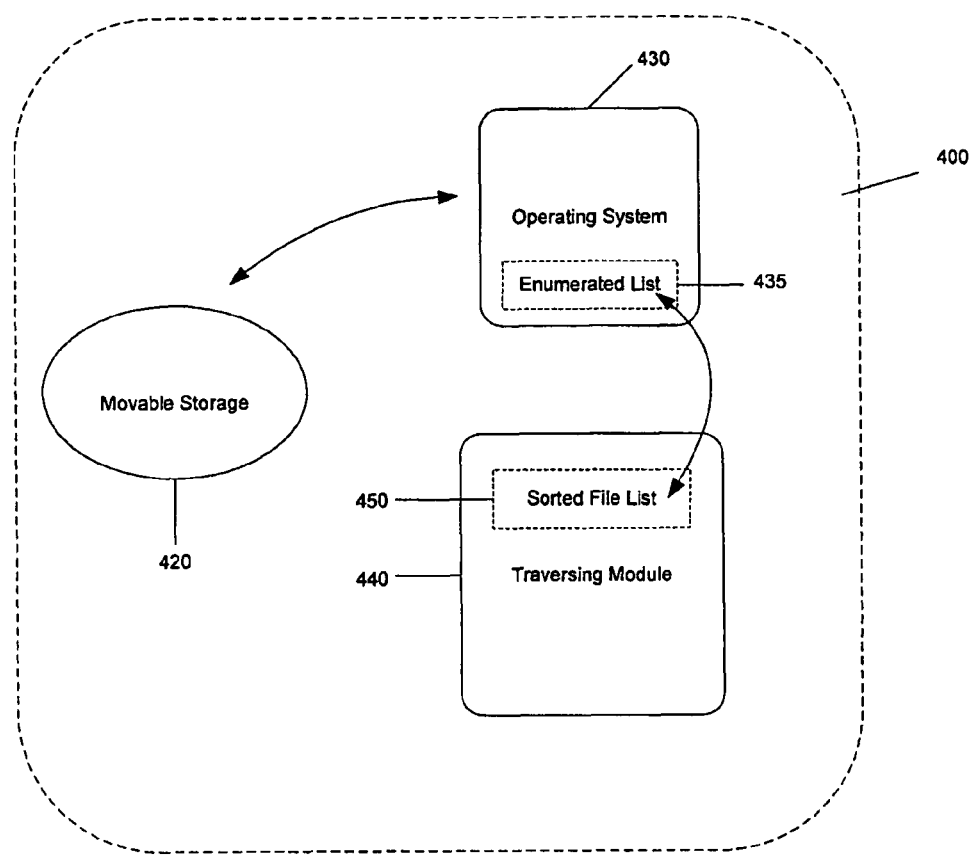
FIG. 4 is a block diagram of one embodiment of an apparatus for rapidly traversing disc volumes during file content examination.

As described herein, the elapsed time required to examine the contents of files stored on a movable storage medium may be significantly reduced by examining the files in a sequence associated with their location on the movable storage medium. One embodiment of an apparatus for rapidly traversing disc volumes during file content examination 410 is shown in FIG. 4. The traversing apparatus 410 comprises a movable storage medium 420 that is communicatively coupled to an operating system 430 capable of executing computer-executable instructions. The operating system 430 includes an enumerated file list 435 that associates the names of files stored on the movable storage medium 420 with their physical location on the medium. The apparatus 410 further comprises a traversing module 440 and a sorted file list module 450. The traversing module 440 is communicatively coupled with the operating system 430 and the enumerated file list 435. Upon activation, the traversing module 440 accesses the enumerated file list creating a sorted file list 450 that is returned to the operating system 430 for use in conducting the examination of the movable storage medium 420. For illustrative purposes it is beneficial to apply the methodology described herein to one embodiment of an enumerated file list. One skilled in the relevant art will recognize there are numerous organizational schemes and architectures for enumerating files on movable storage media. It is contemplated that the present invention is not limited to any particular organizational scheme or architectures and is neither platform nor computer protocol dependent. Indeed the present invention is contemplated to be equally effective regardless of its implementation through software, firmware, or hardware, or any combination thereof.

Figure 5:
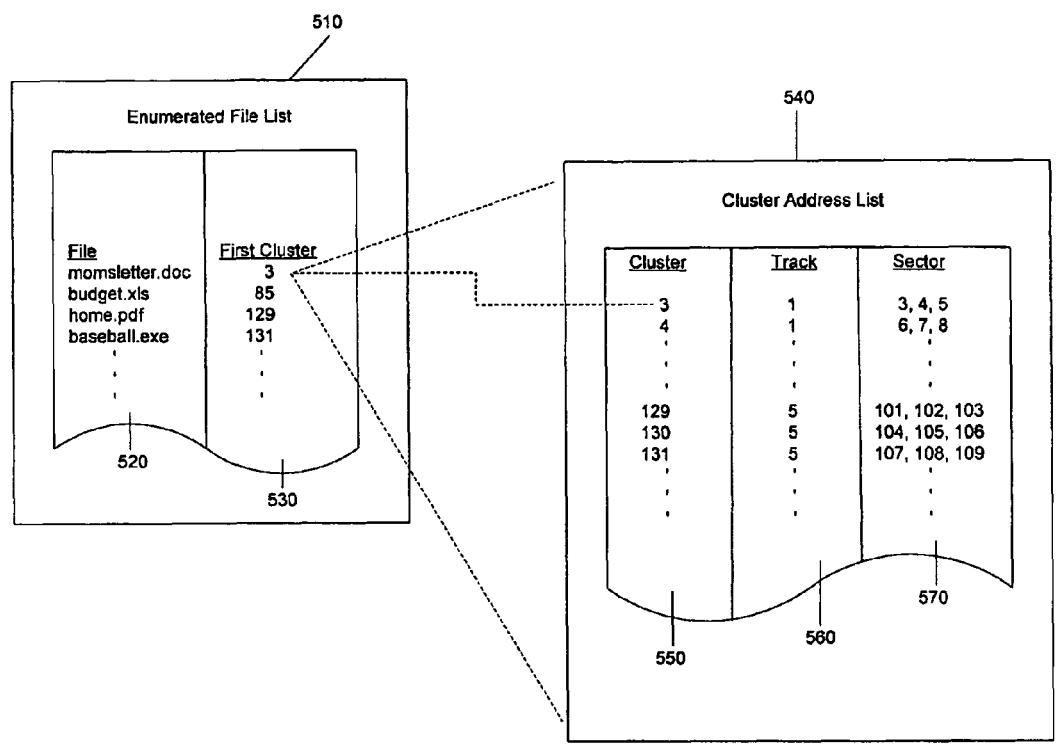
FIG. 5 is a block diagram of one embodiment of an enumerated file list.

FIG. 5 shows one embodiment of an enumerated file list 510 for a movable storage medium. The enumerated file list 510 includes a by name file list 520 and the first cluster identification list 530. In one embodiment the first cluster identification list 530 expands into a cluster address list 540 that contains more detailed information about where the cluster is physically located on the movable storage medium 420. The cluster address list 540 includes in this embodiment an enumerated list of the clusters 550 on the movable storage medium and a corresponding list for each cluster's track 560 and sector 570. The result is a detailed map of the physical location of the first cluster housing a particular file. For example in the embodiment presented in FIG. 5, the enumerated file list 510 includes the file named "Mom's letter.doc". The first cluster of space on the movable storage medium 420 containing data for this file is number 3. According to the cluster address list 540, cluster 3 is located on track 1 at sectors 3 through 5. If the size "Mom's letter.doc" only occupied one cluster, the process would conclude. However, as described herein, files normally occupy multiple clusters, resulting in fragmentation of files.

FIG. 6 is a block diagram of one embodiment of a cluster address list for the file "Mom's letter.doc". In this example this file "Mom's letter.doc" is fragmented and stored in several nonadjacent clusters. The enumerated file list 510 expands to provide a list of clusters 620, tracks 630, and sectors 640. As shown, "Mom's letter.doc" is associated with clusters 3, 95, 32, and 15. As can be appreciated by one skilled in the relevant art, enumerated file lists 510 are typically organized in a logical manner. In this example, when file "Mom's letter.doc" was input onto the movable storage medium 420, the data was first entered into cluster 3, then into cluster 95, then into cluster 32 and finally cluster 15. A typical retrieval of "Mom's letter.doc" would also follow that path. As is contemplated in the present invention, the elapsed time for the retrieval of data contained in these clusters for the purposes of, in one embodiment, examination for malicious code can be significantly reduced if the clusters were first sorted according to their physical location on the movable storage medium 420.

Figure 7:
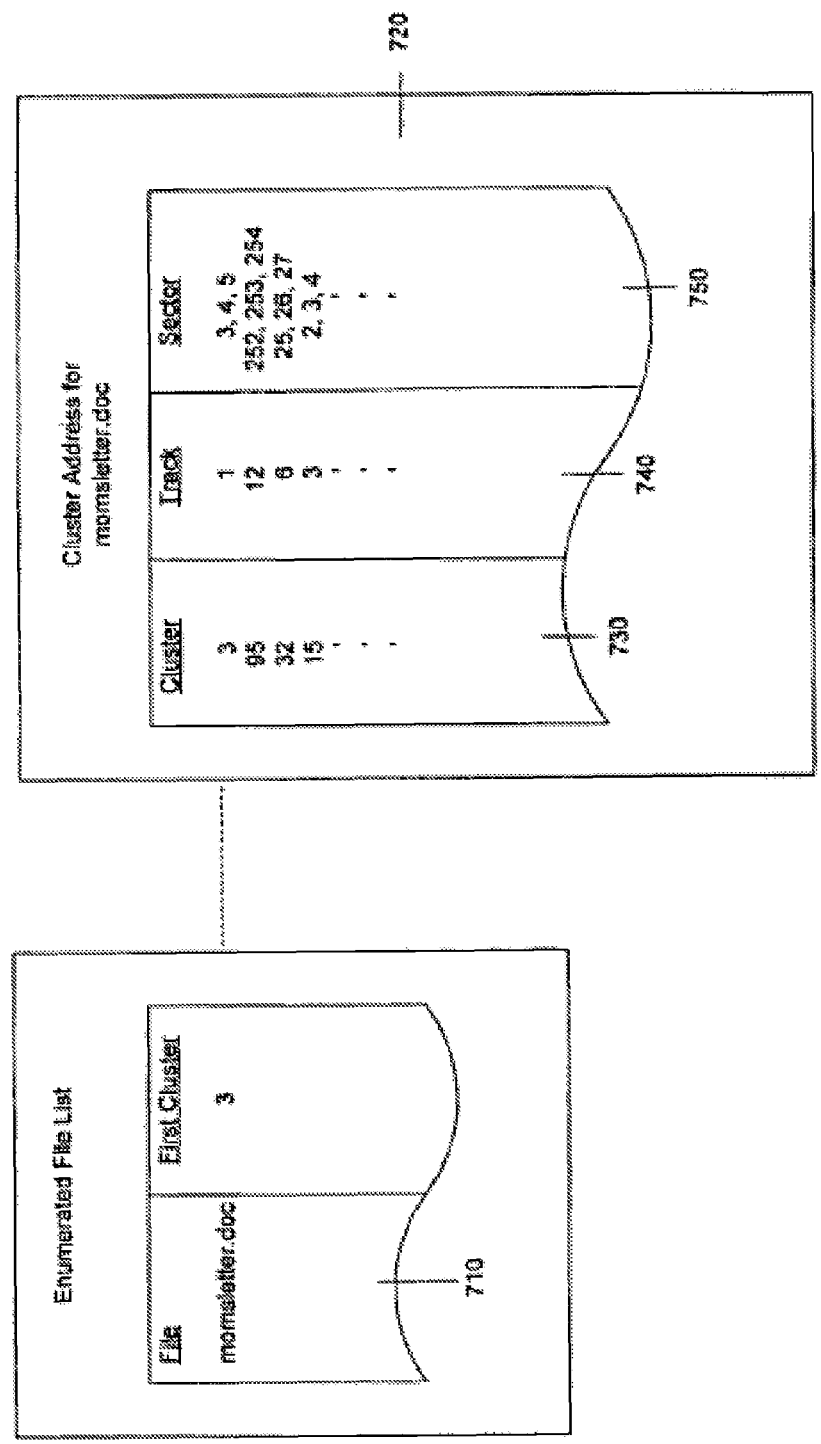
FIG. 7 is a block diagram of one embodiment of a cluster address list for a file contained on a movable storage medium sorted by the file's physical location.

FIG. 7 is a block diagram of one embodiment of a sorted cluster address list for the file "Mom's letter.doc". The sorted cluster list for "Mom's letter.doc" 710 includes cluster 720, track 730, and sector 740 information. The information is sorted by location such that the movement of the head 140 housing a device that reads the data contained on the movable storage medium 420 is minimized. Rather than moving from cluster 3, track 1, sectors 3 through 5, to cluster 95, track 12, sectors 252 through 254, and so forth, the head 140 moves from cluster 3, track 1, sectors 3 through 5, to cluster 15, track 3, sectors 2 through 4, and then cluster 32, track 6, sectors 25 through 27. As more fragmented files are included into the examination list, the content read by the head 140 may shift from file to file yet still minimizing the mechanical movement of the head 140. As described herein the selection criteria of what files to be examined and the criteria for sorting can be varied to optimize examination.

In another embodiment of the present invention, files are read and examined in the logical order. Files selected for examination from the enumerated list, or portions thereof, are sorted 250 according to their physical location to minimize movement of the head 140. In yet another embodiment of the present invention, batches of files are selected from the enumerated list 435, sorted 330 according to their physical location, and examined.

While it is contemplated that the present invention will be used on individual computers having relatively few movable storage media, it is possible to apply the methodology presented here to computing environments with multiple drives or multiple movable storage media located in at least one location. This includes scenarios where multiple logical volumes reside on one physical drive, and where a logical volume spans multiple physical drives. Although not required, method embodiments of the invention can be implemented via computer-executable instructions, such as routines executed by a general-purpose computer, e.g., a server or client computer. The computer-executable instructions can reside on at least one computer-readable media, such as hard discs, floppy discs, optical drives, Compact Discs, Digital Video Discs, etc. Those skilled in the relevant art will appreciate that the invention can be practiced with other computer system configurations, including Internet appliances, handheld devices, wearable computers, cellular or mobile phones, multi-processor systems, microprocessor-based or programmable consumer electronics, set-top boxes, network PCs, mini-computers, mainframe computers and the like. The invention can be embodied in a special purpose computer or data processor that is specifically programmed, configured, or constructed to perform at least one of the computer-executable instructions as explained herein. The invention can also be practiced in distributed computing environments where tasks or modules are performed by remote processing devices, which are linked through a communications network. In a distributed computing environment, program modules may be located in both local and remote memory storage devices. Indeed, the term "computer," as used generally herein, refers to any of the above devices and systems, as well as any data processor.

The above description is included to illustrate the operation of various embodiments of the invention and is not meant to limit the scope of the invention. The elements and steps of the various embodiments described above can be combined to provide further embodiments. The scope of the invention is to be limited only by the following claims. Accordingly, from the above discussion, many variations will be apparent to one skilled in the art that would yet be encompassed by the spirit and scope of the present invention.

What is claimed is:

1. A method for examination of electronic data stored on a movable digital storage medium for malicious computer code, the method comprising:
   using a processor to perform steps comprising:
      establishing a batch of electronic files for the examination;
      identifying each file in the batch having a plurality of fragments stored at a plurality of non-contiguous physical locations on the movable digital storage medium and having a portion comprising a fragment containing a majority of the file stored in one or more contiguous physical locations on the movable digital storage medium;
      designating each file in the batch having the portion for the examination;
      generating a file list associating the one or more contiguous physical locations of the portions on the movable digital storage medium with the designated files;
      sorting the file list by the one or more contiguous physical locations of the portions to form a sort order; and
      examining the portions of the designated files for the malicious computer code in the sort order.

2. The method of claim 1 wherein the electronic files contain data.

3. The method of claim 1 wherein the electronic files contain executable code.

4. The method of claim 1, further comprising:
   creating an examined file list;
   comparing the examined file list to the file list; and
   identifying an additional batch of electronic files that have not been examined from the examined file list.

5. The method of claim 1, wherein the examining step further comprises minimizing movement of at least one mechanical device used to access the identified batch of electronic files.

6. The method of claim 1 wherein the electronic files reside in multiple logical volumes located on one physical hard drive, and wherein the examining step comprises examining the electronic files on each logical volume in parallel.

7. The method of claim 1, further comprising:
   accessing an enumerated list of electronic files stored on the movable digital storage medium, wherein the batch of electronic files for the examination is established based on the enumerated list of electronic files.

8. The method of claim 1, wherein the sorting sorts the file list by the one or more contiguous physical locations of the portions comprising fragments containing majorities of the files to form the sort order.

9. The method of claim 1, further comprising determining whether the portion is within a certain region of the movable digital storage medium, and wherein the designating designates a file responsive to whether the portion is within the certain region.

10. The method of claim 1, further comprising:

responsive to a determination that a fragmented file in the batch having a plurality of fragments stored at a plurality of non-contiguous physical locations on the movable digital storage medium does not have a portion comprising a fragment containing a majority of the file, determining an average physical location of the fragmented file on the movable digital storage medium;

wherein the generating generates a file list associating the average physical location of the fragmented file with the fragmented file.

11. The method of claim 1, further comprising:

responsive to a determination that a fragmented file in the batch having a plurality of fragments stored at a plurality of non-contiguous physical locations on the movable digital storage medium does not have a portion comprising a fragment containing a majority of the file, determining a median physical location of the fragmented file on the movable digital storage medium;

wherein the generating generates a file list associating the median physical location of the fragmented file with the fragmented file.

12. At least one non-transitory computer-readable medium containing computer program instructions for examination of electronic files stored on a movable digital storage medium for malicious computer code, the computer program instructions performing the steps of:

establishing a batch of electronic files for the examination;

identifying each file in the batch having a plurality of fragments stored at a plurality of non-contiguous physical locations on the movable digital storage medium and having a portion comprising a fragment containing a majority of the file stored in one or more contiguous physical locations on the movable digital storage medium;

designating each file in the batch having the portion for the examination;

generating an enumerated file list associating the one or more contiguous physical locations of the portions on the movable digital storage medium with the designated files;

sorting the enumerated file list by the one or more contiguous physical locations of the portions to form a sort order; and examining the portions of the designated files for the malicious computer code in the sort order.

13. The at least one computer-readable medium of claim 12, wherein the computer program instructions further perform the steps of:

creating an examined file list; and identifying an additional batch of electronic files that have not been examined from the examined file list.

14. The at least one computer-readable medium of claim 12, wherein the electronic files are located on at least one drive.

15. The at least one computer-readable medium of claim 12, wherein the examining step further comprises minimizing movement of at least one mechanical device used to access the identified batch of electronic files.

16. Apparatus for examination of digital file content for malicious computer code, the apparatus comprising:

a processor and a memory and communicatively coupled to a movable storage medium;

at least one enumerated file list stored on the movable storage medium, wherein the at least one enumerated file list associates one or more portions designated for the examination of at least one electronic file of a batch of files identified for the examination with one or more contiguous physical locations on the movable storage medium, wherein each designated portion comprises a fragment of a plurality of fragments of the electronic file, the plurality of fragments of the electronic file stored at a plurality of non-contiguous physical locations on the movable storage medium, the fragment of the designated portion containing a majority of the file in the one or more contiguous physical locations on the movable storage medium; and a traversing module executed by the processor to:

read the at least one enumerated file list into the memory;

sort the at least one enumerated file list by the one or more contiguous physical locations associated with the one or more designated portions to form a sort order; and examine the one or more designated portions for the malicious computer code according to the sort order.

17. The apparatus of claim 16, wherein the traversing module, upon identifying a batch of electronic files for the examination, directs an operating system to:

create an examined file list; and identify an additional batch of electronic files that have not been examined from the at least one enumerated file list.

18. The apparatus of claim 16, wherein the electronic files are located on at least one disc drive.

\* \* \* \* \*